United States Patent [19]
Duggan

[11] Patent Number: 5,720,645
[45] Date of Patent: Feb. 24, 1998

[54] BALANCING TOY SET

[76] Inventor: J. Edmund Duggan, 1987 Dellwood Dr., Atlanta, Ga. 30309

[21] Appl. No.: 690,048

[22] Filed: Jul. 31, 1996

Related U.S. Application Data

[63] Continuation of Ser. No. 503,333, Jul. 17, 1995, abandoned.

[51] Int. Cl.⁶ .................................................. A63H 15/00
[52] U.S. Cl. ................................................ 446/396; 273/449
[58] Field of Search .................................. 446/396, 325, 446/326; 273/156, 450, 449; 434/300

[56] References Cited

U.S. PATENT DOCUMENTS

| | | | |
|---|---|---|---|
| 2,190,800 | 2/1940 | Murphy | 446/326 |
| 3,092,384 | 6/1963 | Herne | 446/396 |
| 3,550,316 | 12/1970 | MacPherson | 273/449 X |
| 3,614,106 | 10/1971 | Morrison | 273/156 |
| 3,717,340 | 2/1973 | Bowers | 273/450 |
| 4,057,247 | 11/1977 | Morrison | 446/326 |

FOREIGN PATENT DOCUMENTS

| | | | |
|---|---|---|---|
| 98514 | 6/1924 | Austria | 446/101 |

*Primary Examiner*—Mickey Yu

[57] ABSTRACT

A balancing toy set in which a number of balancing members are interconnected on a support and are dependent upon one another for the stable equilibrium of the set. The invention can be constructed in a variety of forms ranging from a simple toy for preschool children to a complex puzzle for adults. The invention is useful both as an amusement device and as an educational tool.

4 Claims, 1 Drawing Sheet

BALANCING TOY SET

This is a continuation of application Ser. No. 08/503,333, filed 1995 Jul. 17, abandoned.

BACKGROUND

1. Field of Invention

This invention relates generally to toy and puzzle amusement devices and more particularly to a balancing toy set for the entertainment, amusement, and education of children and adults.

2. Description of Prior Art

There are a number of amusement devices which feature a plurality of balancing members which are interengageable by vertically stacking one member on top of another.

One such device is described by Morrison et al in U.S. Pat. No. 3,614,106, entitled "Balancing Puzzle Device", issued Oct. 19, 1971.

Another device is described by Morrison in U.S. Pat. No. 4,057,247, entitled "Balancing Toy Set", issued Nov. 8, 1977.

OBJECTS AND ADVANTAGES

Several objects and advantages of the present invention are:

(a) to provide an amusement device which features a plurality of balancing members which are horizontally interengageable and some of which can also be vertically interengageable;

(b) to provide an amusement device which can be made simple enough to be useful in the entertainment and amusement of preschool children or can be made complex enough to entertain adults;

(c) to provide an amusement device which can be made economically from a variety of materials and manufacturing processes;

(d) to provide an educational device to teach principles of physics.

(e) to provide an amusement device which after being assembled may be subject to movement and may be viewed as kinetic sculpture.

Further objects and advantages of my invention will become apparent from a consideration of the drawings and ensuing description.

DRAWING FIGURES

In the drawings, closely related figures have the same number but different alphabetic suffixes.

Figure 1:
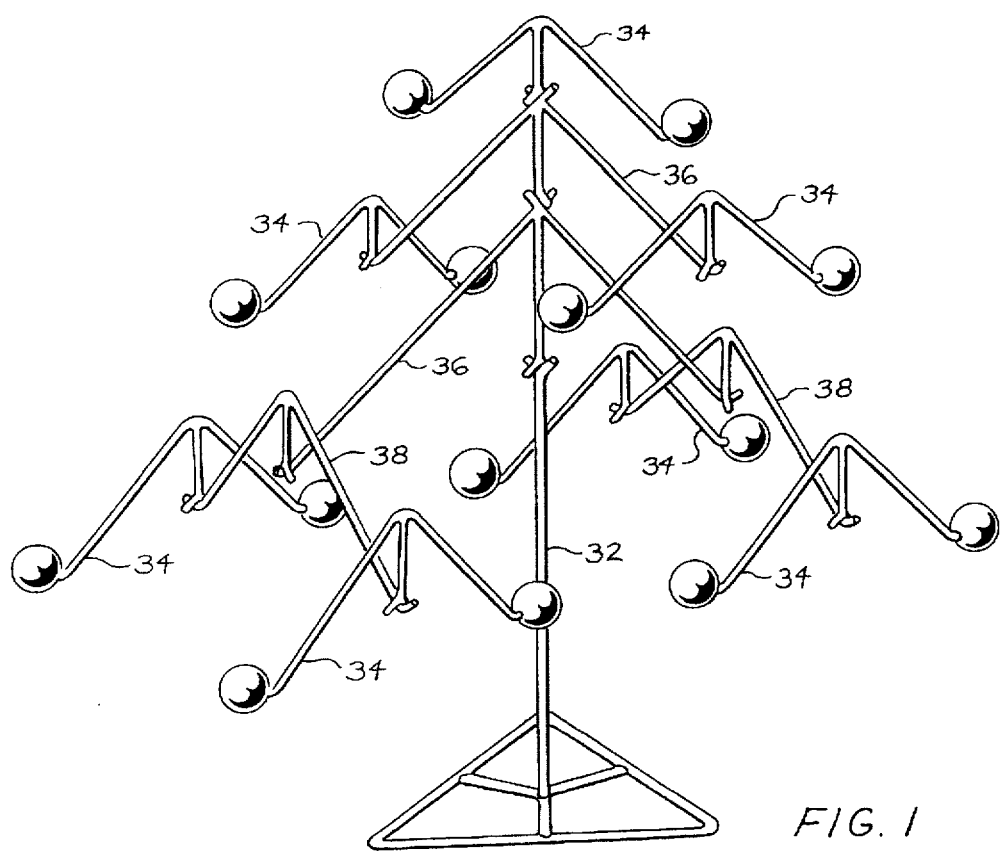
FIG. 1 is a perspective view of one embodiment of the assembled balancing toy set.

REFERENCE NUMERALS IN DRAWINGS 20 arm
22 bottom pivot position
24 end-of-arm pivot position
26 top pivot position
28 support pivot position
30 weight
32 support
34 to 42 balancing members

DESCRIPTION AND OPERATION—FIGS. 1 to 3

Figure 2A:
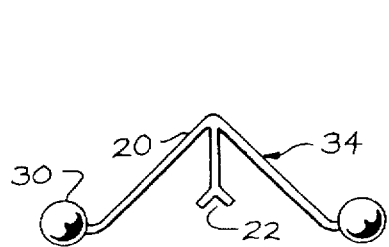
FIGS. 2A to 2C show details of balancing members shown in FIG. 1.
Figure 2B:
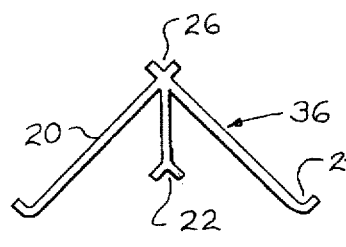
Figure 2C:
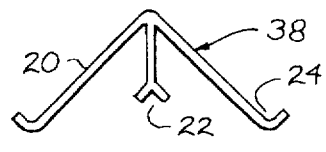

A typical embodiment of the balancing toy set is illustrated in FIG. 1. This illustration shows eleven balancing members which are interengaged and positioned on a support 32. FIGS. 2A, 2B, and 2C show details of three different types of balancing members used in this embodiment. FIG. 2A shows a balancing member 34 with a weight 30 at the end of each arm 20 and a bottom pivot position 22. FIG. 2B shows a balancing member 36 with bottom pivot position 22, a top pivot position 26, and end-of-arm pivot positions 24. FIG. 2C shows a balancing member 38 with bottom pivot position 22 and end-of arm-pivot positions 24.

Figure 3A:
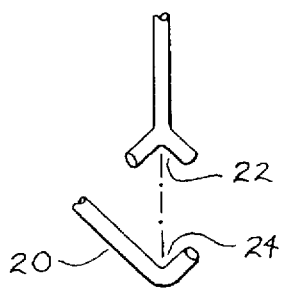
FIGS. 3A to 3C show details of complementary pivot positions of balancing members shown in FIG. 1.
Figure 3B:
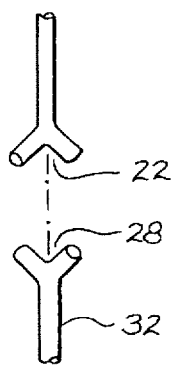
Figure 3C:
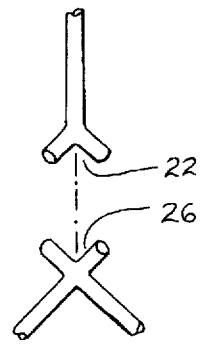

FIGS. 3A and 3C show details of how balancing members interengage with complementary V-shaped pivot positions. FIG. 3B shows how bottom pivot position 22 of one balancing member 36 rests on a complementary support pivot position 28 on support 32.

In this embodiment illustrated in FIG. 1, balancing members 34 have weights 30 which put the center of gravity of the balancing members below bottom pivot positions 22. Balancing members 36 and 38 do not have weights and depend upon the added weight of balancing members 34 to lower the center of gravity of balancing members 36 and 38 below bottom pivot positions 22.

The first step in the assembly of the balancing toy is to make two subassemblies each consisting of one balancing member 38 and two balancing members 34. The bottom pivot positions 22 of the balancing members 34 are placed on both end-of-arm pivot positions 24 of balancing members 38.

The bottom pivot position 22 of each of the two balancing members 38 is then placed on both end-of-arm pivot positions 24 of a balancing member 36. The bottom pivot position 22 of balancing member 36 is then placed on support pivot position 28 of support 32. This results in an assembly of seven balancing members. The center of gravity of the combined balancing members in the assembly is below bottom pivot position 22 of balancing member 36.

Another subassembly is made consisting of a second balancing member 36 and two balancing members 34. This subassembly is placed on a top pivot position 26 of lower balancing member 36. This results in an assembly of ten balancing members.

A seventh balancing member 34 is placed on a top pivot position 26 of upper balancing member 36. The completed balancing toy set has eleven balancing members. The center of gravity of the combined eleven balancing members is below bottom pivot position 22 of lower balancing member 36.

SUMMARY, RAMIFICATIONS, AND SCOPE

As shown by the embodiment of the invention that has been described and illustrated, the invention provides a variety of different amusement devices. Some of the advantages of the invention are:

it can be produced on any scale ranging from the use of small balancing members to large balancing members;

it can be produced to utilize only seven balancing members or up to thousands of balancing members;

it can be produced from a variety of materials and manufacturing processes;

it can be used to display items such as marbles, stones, or golf balls, the items being used for weights on some of the balancing members;

it can be produced with balancing members in the shape of human or animal figures;

it can be produced as kinetic sculpture;

it can be produced as an educational toy to teach cooperation and teamwork in the assembly process;

it can be produced as an educational toy to enhance hand-eye coordination;

it can be produced as an educational toy to teach principles of physics involving moments, center of gravity, and equilibrium;

it can be produced as a puzzle using balancing members with varying sizes and weights or asymmetrical balancing members, the successful solution of the puzzle depending upon having each balancing member in a correct position to achieve stable equilibrium of the assembly;

it can be produced with a large number of balancing members to demonstrate a chain reaction such as occurs when one outside balancing member is removed from the assembled toy resulting in a progressive loss of stable equilibrium and complete disassembly of the toy.

Although the description above contains many specifications, these should not be construed as limiting the scope of the invention but as merely providing illustrations of some of the presently preferred embodiments of this invention. Thus the scope of the invention should be determined by the appended claims and their legal equivalents, rather than by the examples given.

I claim:

1. A balancing toy set comprising:

a) a means for support with a pivot position, b) a center balancing member having a pair of opposing outwardly and downwardly extending arms being of sufficient length so as to extend below the bottom of the member, said center balancing member having pivot positions at said bottom and at ends of said arms, c) two intermediate balancing members of same general configuration as said center balancing member, d) four outside balancing members each having a pair of opposing outwardly and downwardly extending arms being of sufficient length so as to extend below the bottoms of the members, said balancing members having pivot positions at said bottoms and weights at ends of said arms, the center of gravity of said balancing members being below said bottom pivot positions, e) the bottom pivot positions of said two intermediate balancing members being positioned on complementary pivot positions at ends of arms of said center balancing member, the bottom pivot positions of said four outside balancing members being positioned on complementary pivot positions at ends of arms of said two intermediate balancing members, the bottom pivot position of said center balancing member being positioned on complimentary pivot position on said means for support, f) said center balancing member when not assembled as part of said toy set has a center of gravity above said bottom pivot position and will not balance on said means for support without the added weight of said intermediate balancing members and said outside balancing members, g) said intermediate balancing members when not assembled as part of said toy set have centers of gravity above said bottom pivot positions and will not balance on pivot positions at ends of arms of said center balancing member without the added weight of said outside balancing members, h) ends of arms of said center balancing member and said intermediate balancing members each having means for establishing fixed pivot locations which allow swaying motion of balancing members placed on pivot positions.

2. The balancing toy set of claim 1 wherein the size of said center balancing member is greater than the sizes of said intermediate and outside balancing members whereby the positions of said outside balancing members will not interfere with one another.

3. The balancing toy set of claim 1 wherein said center balancing member has a top pivot position upon which is positioned an additional balancing member, said additional balancing member being of the same description as said outside balancing members, the center of gravity of all interengaged balancing members being below said bottom pivot position of said center balancing member resulting in stable equilibrium.

4. The balancing toy set of claim 1 wherein said four outside balancing members are of same general configuration as said intermediate balancing members with pivot positions at bottoms and at ends of arms, and wherein the pivot positions at ends of arms are constructed to support said weights which are detachable.

* * * * *